Dec. 26, 1967  W. H. GRUBIS  3,360,082
BRAKE ASSEMBLY
Filed Dec. 2, 1966  3 Sheets-Sheet 1
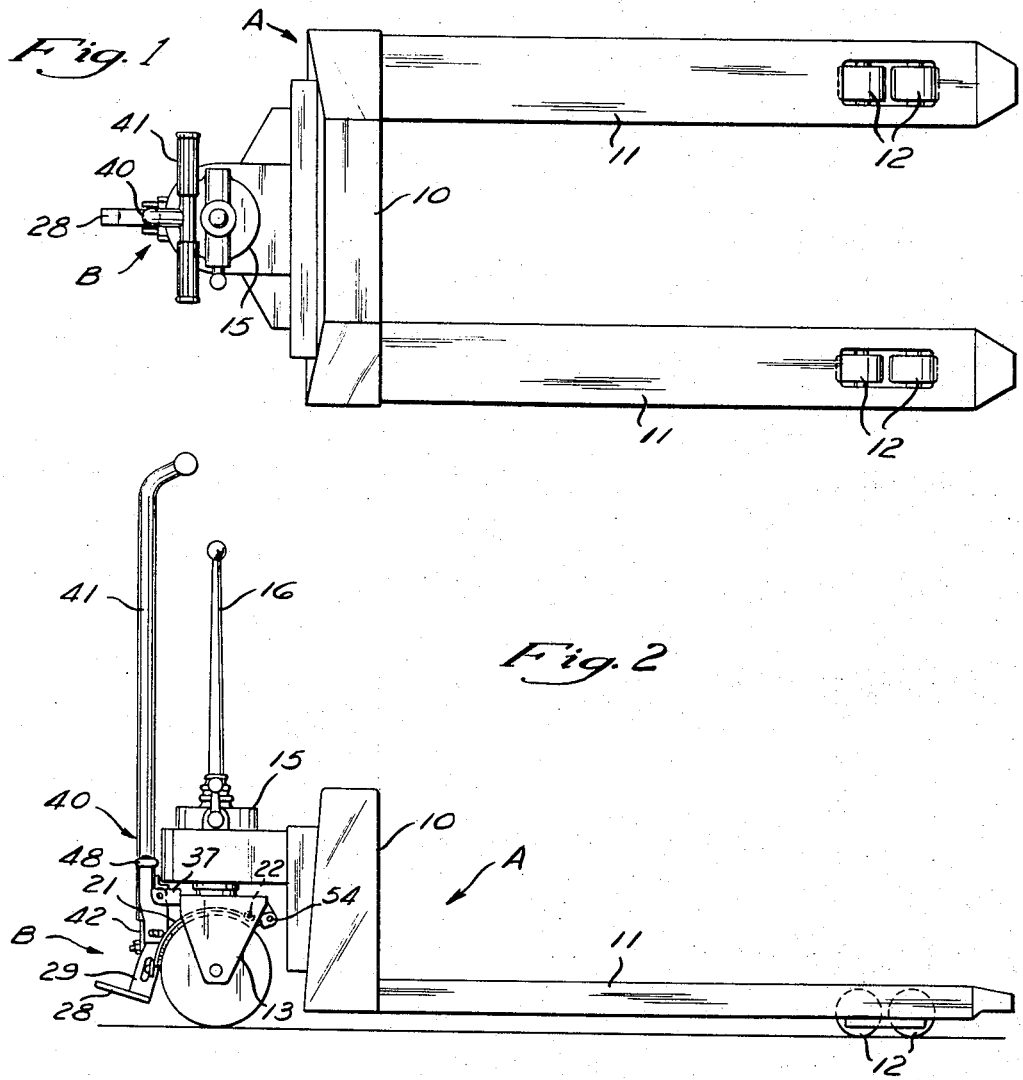
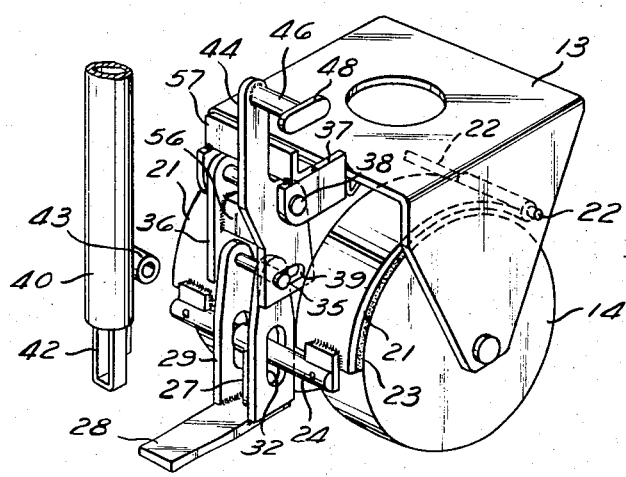
INVENTOR.
WALTER H. GRUBIS
BY Bosworth, Sessions,
Herrstrom and Knowles
ATTORNEYS

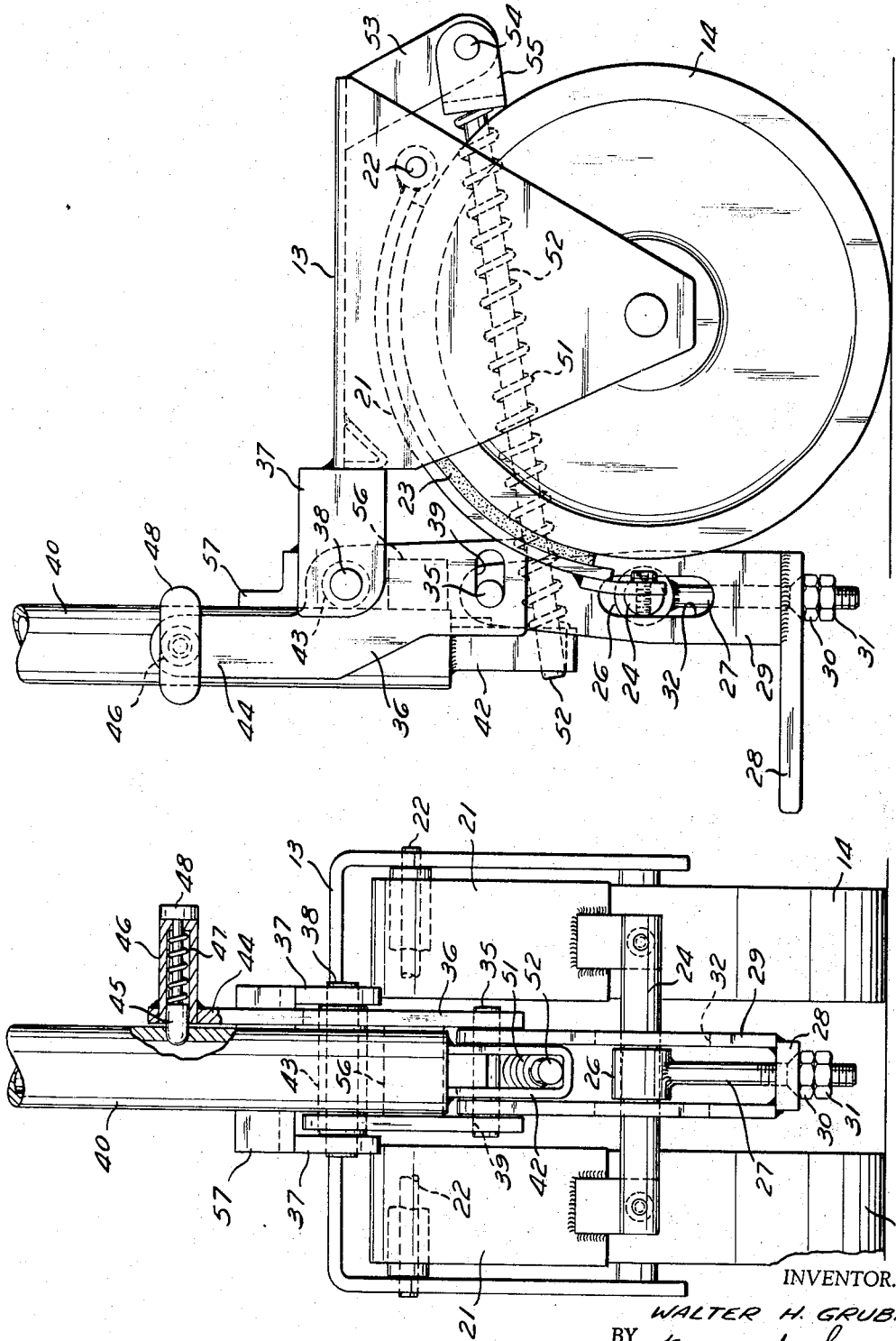

INVENTOR.
WALTER H. GRUBIS
BY
ATTORNEYS

United States Patent Office 3,360,082
Patented Dec. 26, 1967

3,360,082
BRAKE ASSEMBLY
Walter H. Grubis, Burlington, Mass., assignor to
The Colson Corporation, Chicago, Ill.
Filed Dec. 2, 1966, Ser. No. 598,855
5 Claims. (Cl. 188—29)

ABSTRACT OF THE DISCLOSURE

This disclosure relates to a mechanically operated, friction-type wheel brake which utilizes a circumferential brake shoe engageable with the rim of a wheel or roller. The brake may be operated by the handle of a hand truck, such as a pallet truck with a load lifting mechanism, and may be spring biased to an engaged condition to provide a "deadman" feature which assures that braking force will be applied to the wheels whenever the truck is unattended.

Background of the invention

The invention provides a hand operated mechanical wheel brake particularly suited for use on hand trucks for transporting heavy loads across surfaces such as floors and decks. It is usually desirable that brakes for this type of service be operable by the handle which the operator uses to push or pull the truck. It is also important in many instances that the brakes be automatically applied whenever the operator releases the handle so that the truck will not roll unattended down an inclined and damage its load.

Particularly problems arise where hand trucks are used aboard ships since the rolling and tossing of the ship in heavy seas continually changes the slope of the deck and wheel brakes which are adequate to hold the wheels against rolling when the truck is not loaded often are ineffective when the truck is carrying a heavy load.

Where a hinged operating handle is used to push or pull the truck, the handle is usually movable between a limiting upright position for pushing and a tilted position for pulling. Where the handle is also used to operate the brakes, it is preferable that the upright vertical position be the brake applying position in order to conserve space and minimize the possibility of accidental brake release. Where this is the case, however, the truck cannot be pushed when the handle is in its upright position.

The brake assembly of the present invention overcomes the objections indicated above and affords other features and advantages not obtainable from the prior art.

Summary of the invention

According to the invention a mechanically operated friction type wheel brake assembly is provided for use on a hand truck having a frame and preferably two load rollers or wheels to which braking force is applied, depending of course on the wheel geometry of the truck. The assembly comprises a brake shoe for each wheel to be braked, the shoe being pivotally connected at one end to the frame for movement between a downward position in which braking force is applied to the rim of the roller, and an upward position wherein the braking force is relieved. The pivotal movement is about an axis parallel to the axis of the roller. An operating lever is pivotally connected intermediate its ends to the frame, one end of the lever being a handle for pushing or pulling the truck and the other end including a lever arm. The handle is movable between a forward brake applying position and a rearward brake releasing position, the pivotal movement thereof being about an axis parallel to the axis of the roller. The outer end of the lever arm is connected by a link to the swinging end of the brake shoe so that when the handle is in its forward position the arm forces the brake shoe to its downward position to apply braking force and when the handle is in its rearward position the arm lifts the brake shoe to relieve the braking force.

According to one aspect of the invention the handle is biased to its forward position such as by a coil spring mounted on the frame and adapted to bear against the lever arm to force the handle forward.

According to a supplemental aspect of the invention the lever arm is releasable from the handle so that the handle may be used in its forward upright position to push the truck with the brakes released.

According to another supplemental aspect of the invention the lever arm of the operating lever is provided with a slot which receives a pin connecting one end of the link to the lever arm. The pin is slidable in the slot to an over-center position which prevents the brake shoe from lifting and thus locks the brakes in their braking position, the slot being generally perpendicular to a radial line from the slot to the axis of rotation of the operating lever. The link is preferably forced into its over-center locking position by a foot pedal secured to a downward extension of the link. The connection between the link and the brake shoe is preferably adjustable so that the braking force can be varied as desired and to compensate for wear of the brake linings.

Brief description of the drawings

FIGURE 1 is a plan view of a hand operated pallet truck having a lifting mechanism and utilizing a brake assembly embodying the invention;

FIGURE 2 is an elevational view of the pallet truck of FIGURE 1 with the operating handle shown in its upright forward position and the brakes applied to the load rollers;

FIGURE 3 is a partially exploded perspective view showing the brake assembly utilized in the pallet truck of FIGURES 1 and 2, the brakes being shown in their operating candition with the foot operated link in its over-center locking position;

FIGURE 4 is an end elevational view of the brake assembly of FIGURE 3 with parts broken away and shown in section;

FIGURE 5 is an elevational view of the brake assembly of FIGURE 4 showing the brakes in their operating condition according to FIGURE 3.

Description of the preferred embodiment

Figure 6:
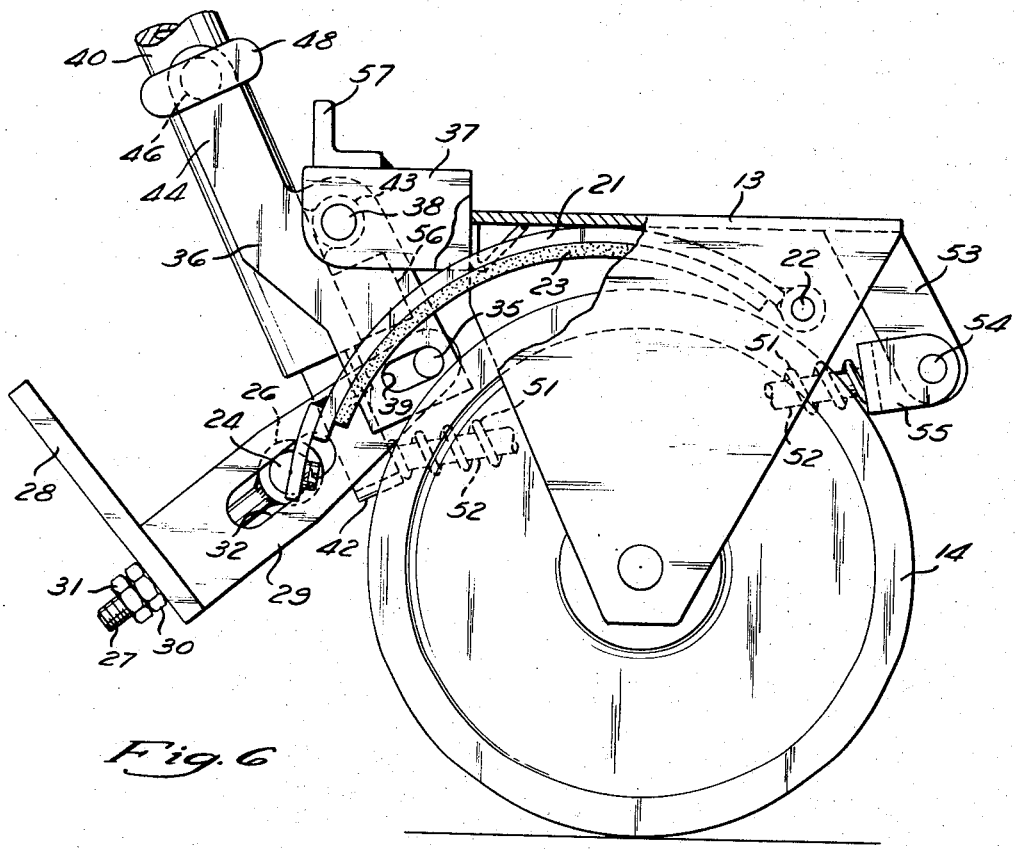
FIGURE 6 is an elevational view similar to FIGURE 5 showing the handle in its rearward or tilted position and the brake drum lifted from the load rollers to relieve the braking force.

Referring more particularly to the drawings, FIGURES 1 and 2 show a pallet truck A having a friction type wheel brake assembly B embodying the invention. The pallet truck A includes a main frame 10 including two load supporting forks 11. The forward end of the truck A is supported on front rollers 12, two of which are mounted in tandem in each fork 11. The rearward end of the main frame 10 rests against a wheel fork 13 in which are mounted two load rollers 14.

Located in the main frame 10 and over the wheel fork 13 is a hydraulic pump 15 which is manually operated by a handle 16. The hydraulic pump 15 operates a hydraulic cylinder (not shown) within the main frame 10, the cylinder being operable to raise the forks 11 of the main frame 10 so that a load to be carried on the forks may be lifted to a transporting position clear of the surface on which the pallet truck A is being operated.

In the operation of the pallet truck A the load supporting forks 11 are moved into position under a load carrying pallet. The pump handle 16 is then operated manually to operate the cylinder and raise the forks 11 together with the pallet and load to a carrying position. The truck A may then be pushed or pulled to carry the load to a new location. When the pallet has been relocated, the hydraulic pressure in the cylinder is relieved to lower the forks 11 and deposit the pallet and load on the surface.

FIGURES 3, 4, 5 and 6 show the brake assembly B which is used to apply braking force to the load rollers 14. The assembly B includes two circumferential brake shoes 21 pivotally connected at their forward ends to the wheel fork 13 by means of a hinge pin 22. The brake shoes 21 have linings 23 secured to their inner faces for engaging the rims of the load rollers 14.

The ends of the brake shoes 21 opposite the hinge pin 22 are connected together by a rod 24 which is received midway between its ends, in a sleeve portion 26 of a T shaped member 27. The opposite end of the member 27 is threaded and extends through an opening in a foot pedal 28 welded to the bottom of a bifurcated link 29, the member 27 being adjustable relative to the foot pedal 28 and link 29 by means of adjusting nuts 30 and 31. The rod 24 extends through slots 35 formed in the bifurcations of the link 29 to permit longitudinal adjustment of the ends of brake shoes 21 relative to the link 29 to vary the braking force to be applied to the rollers 14.

The upper end of the bifurcated link 29 is pivotally connected by a rod 35 extending between the bifurcations, to a bifurcated lever arm 36, the arm 36 being pivotally connected to a bracket 37 welded to the wheel fork 13 by means of a hinge pin 38. The rod 35 is received at its opposite ends in slots 39 formed in the bifurcations of the lever arm 36, the slots 39 being substantially perpendicular to a radial line from the slot to the axis of rotation of the lever arm 36.

Also pivotally mounted on the hinge pin 38 is an operating lever 40 including an upwardly extending handle 41 and a lower end having a loop 42 formed thereon. The operating lever 40 is mounted on the hinge pin 38 by means of a bushing 43 welded to the lever 40 (FIGURE 3).

The bifurcated lever arm 36 is normally fastened to the operating lever 40 for pivotal movement therewith by means of an upwardly extending end 44 of the arm 36 which carries a plunger 45 that seats in a bore in the handle 41. The plunger 45 is carried in a sleeve 46 welded to the end 44 of the arm 36, and is spring biased toward the handle by a helical spring 47. The plunger 45 may be retracted to release the lever arm 36 from the handle 40 by means of a T shaped handle 48 (FIGURE 4).

The operating lever 40 is biased to its upright brake applying position with the handle 41 vertical (FIGURES 1, 2, 4 and 5) by means of a helical spring 51 which bears against the loop 42 at the lower end of the lever 40 (FIGURE 5). The spring 51 is positioned around a rod 52 which is pivoted at one end to a bracket 53 welded to the wheel fork 13, the rod 52 being connected to the bracket 53 by means of a pin 54 mounted in a forked member 55 at the end of the rod 52. The opposite end of the rod 52 extends through the loop 42 of the operating lever 40 and slides therein between the positions shown in FIGURES 5 and 6.

The lower end of the lever arm 40 bears against a web 56 which connects the bifurcations of the lever 36. Accordingly when the plunger 45 is in engagement with the opening in the handle 41 the pivotal movement of the lever arm 40 carries with it the bifurcated lever arm 36 between the two positions shown in FIGURE 5 and FIGURE 6.

Braking force is applied to the load rollers 14 when the operating lever 40 and bifurcated lever arm 36 are in the vertical position shown in FIGURE 5. In this position the brake pedal 28 may be pressed to pivot the bifurcated link 29 about the rod 24 to move the rod 35 to the left in the slot 39 as viewed in FIGURE 5. This brings the rod 35 to an over-center position between the hinge pin 38 and the rod 24 and thus locks the brake shoes 21 in their downward position applying braking force to the rims of the load roller 14. Forward movement of the lever arm 40 is limited by an angle member 57 welded to the bracket 37 (FIGURE 5).

*Operation*

To apply braking force to the load rollers 14 when the plunger 45 is latched to the handle 41 the handle need only be moved to its vertical or forward position. Since the handle 41 is spring biased to this position a "deadman" feature is provided which prevents the pallet truck A from rolling unattended down a sloping surface. When the handle is in its vertical or forward position the pin 35 is in its lowermost position as shown in FIGURE 5. This forces the bifurcated link 29 and the rod 24 downward through the arc defined by the outer end of the brake shoes 21 as they swing around the hinge pin 22. Accordingly the linings 23 of the brake shoes 21 are forced into braking engagement with the rims of the load rollers 14.

Additional braking force may be applied such as when the truck is loaded by pressing the foot pedal 28 downward. This pivots the bifurcated link 29 about the rod 24 and swings the rod 35 rearwardly in the slots 39 to an over-center position which provides a positive break lock.

To release the brakes the handle 41 is pulled rearwardly such as to the position shown in FIGURE 6 with the plunger 45 in its latched position. This swings the lower end of the bifurcated lever arm 36 forwardly against the resisting force of the helical spring 47 and also lifts the bifurcated link 29 upward. This upward movement swings the rod 24 and the brake shoes 21 upward about the hinge pin 22 to release the brakes and permit the pallet truck A to be pulled by the operator.

To push the pallet truck A forward or to the right as viewed in FIGURES 1, 2 and 5, with the handle 41 in its vertical or forward position, the brakes must be released by pulling out the plunger 45 from the handle 41 using the T shaped handle 48. This permits the lower end of the bifurcated lever arm 36 to swing forward independent of the handle 41 and while the linings of the brake linings 23 of the brake shoes 21 may rest lightly against the load rollers 14, braking force will not be applied. The foot pedal may be used to apply the brakes however, while the pallet truck A is being pushed. To re-engage the handle and the bifurcated lever arm 36 the handle 41 is merely pulled back until the plunger 45 reseats itself in the bore in the handle 41.

It will be understood that this invention has been shown and described with reference to a preferred embodiment thereof which is intended for the purpose of illustration rather than limitation, and other variations and modifications will be apparent to those skilled in the art within the intended spirit and scope of the invention, wherefore the patent is not to be limited to the form of brake assembly herein as specifically illustrated and described nor in any other manner inconsistent with the progress by which the art has been promoted by this invention.

I claim:

1. In a hand truck having a frame, load rollers, and a brake assembly for braking at least one of the rollers including a brake shoe pivotally connected at its forward end to the frame for movement between a downward position in braking engagement with the rim of the roller and an upward position out of braking engagement with the rim of the roller, an operating lever pivotally connected intermediate its ends to the frame and having an upwardly extending handle for pushing and pulling the truck, the handle being movable between a forward brake applying position and a rearward brake releasing position and means biasing the handle to its forward position; the improvement which comprises a connecting lever mounted for pivotal movement about the same axis as said operating lever, said connecting lever adapted to be releasably secured to said handle for pivotal movement therewith and having a downwardly extending arm, a link pivotally connected at one end to said arm and pivotally connected intermediate its ends to the rearward end of said brake shoe and means associated with the other end of said link for applying braking force when said connecting arm is released from said handle.

2. A brake assembly as defined in claim 1 wherein said connecting lever has a slot formed in the downwardly extending arm thereof and wherein said link has a pin mounted transversely thereon which is slidably received in said slot and movable therein between an over-center position wherein said brake shoe is prevented from lifting out of its said braking position, and a second position, said slot being generally perpendicular to a radial line from said slot to the axis of rotation of said operating lever whereby said link may be forced into its over-center locking position by said means for applying braking force.

3. A brake assembly as defined in claim 1 wherein said brake assembly is adapted to brake two coaxial load rollers and wherein two of said brake shoes are connected together for coaxial pivotal movement in parallel planes to brake said two load rollers simultaneously.

4. A brake assembly as defined in claim 1 wherein said other end of said brake shoe is connected to said link at an adjustable location so that the braking force to be applied may be varied.

5. In combination, a hand truck having a frame and load rollers and a brake assembly for braking at least one of said rollers including a brake shoe pivotally connected at its forward end to said frame for movement between a downward position in braking engagement with the rim of the roller and an upward position out of braking engagement with the rim of the roller, an operating lever pivotally connected intermediate its ends to the frame and having an upwardly extending handle for pushing and pulling the truck, the handle being movable between a forward brake applying position and a rearward brake releasing position and means biasing said handle to its forward position; the improvement which comprises a connecting lever mounted for pivotal movement about the same axis as said operating lever, said connecting lever adapted to be releasably secured to said handle for pivotal movement therewith, and having a downwardly extending arm, a link pivotally connected at one end to said arm and pivotally connected intermediate its ends to the rearward end of said brake shoe, and means associated with the other end of said link for applying braking force when said connecting arm is released from said handle.

References Cited

UNITED STATES PATENTS

| | | | |
|---|---|---|---|
| 302,359 | 7/1884 | Sparks | 188—29 |
| 367,965 | 8/1887 | Dewey | 188—29 |
| 2,738,034 | 3/1956 | Levine | 188—29 |
| 3,074,516 | 1/1963 | Wood | 188—22 |

FOREIGN PATENTS

| | | |
|---|---|---|
| 160,633 | 3/1921 | Great Britain. |

MILTON BUCHLER, *Primary Examiner.*

W. T. BUCKMAN, *Assistant Examiner.*